(12) United States Patent
Butler, Jr.

(10) Patent No.: US 6,263,727 B1
(45) Date of Patent: Jul. 24, 2001

(54) MAKE VOLTAGE BIAS ION SENSE MISFIRED DETECTION SYSTEM

(75) Inventor: Raymond O. Butler, Jr., Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/328,747

(22) Filed: Jun. 9, 1999

(51) Int. Cl.$^7$ .............................. G01L 3/26; G01L 5/13; G01M 15/00
(52) U.S. Cl. ........................................................ 73/117.2
(58) Field of Search ................................... 73/116, 117.2, 73/118.1, 119 R; 324/380, 381, 388, 393, 399, 402; 123/425, 435

(56) References Cited

U.S. PATENT DOCUMENTS

| | | |
|---|---|---|
| 5,675,072 | 10/1997 | Yasuda et al. ........................ 73/35.08 |
| 5,676,113 | 10/1997 | Johansson et al. ................... 123/425 |
| 5,769,049 | 6/1998 | Nytomt et al. ........................ 123/435 |
| 5,775,298 | 7/1998 | Haller .................................. 123/425 |
| 5,803,047 | 9/1998 | Rask ..................................... 123/425 |
| 5,814,994 | 9/1998 | Hohner et al. ........................ 324/380 |
| 5,866,808 | 2/1999 | Ooyabu et al. ......................... 73/116 |

*Primary Examiner*—William Oen
(74) *Attorney, Agent, or Firm*—Margaret A. Dobrowitsky

(57) ABSTRACT

An apparatus for detecting a combustion condition such as misfire in an internal combustion engine. During an initial charging operation, a make voltage is developed across a secondary winding of the ignition coil, and thence across the electrodes of a spark plug. After combustion, the ignition coil is recharged to thereby again develop the make voltage across the secondary winding to bias the spark plug. The make voltage provides the bias across the spark plug electrodes to cause an ion current flow if combustion has in-fact occurred. The ion current is sensed with a sensing resistor.

18 Claims, 2 Drawing Sheets

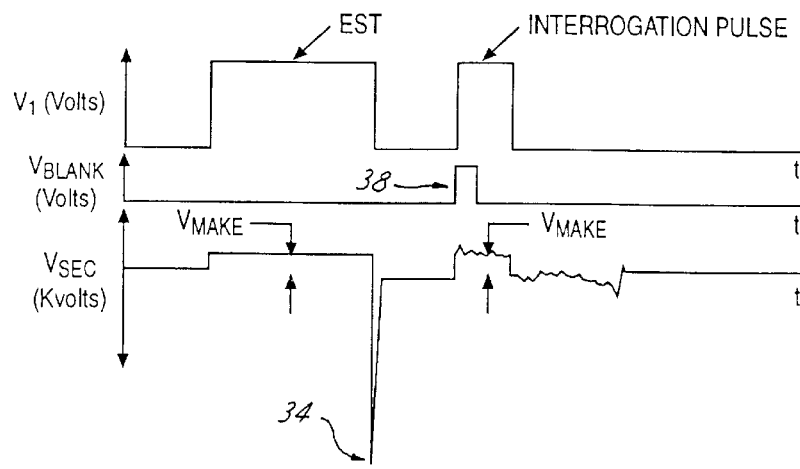
FIG. 2A
FIG. 2B
FIG. 2C
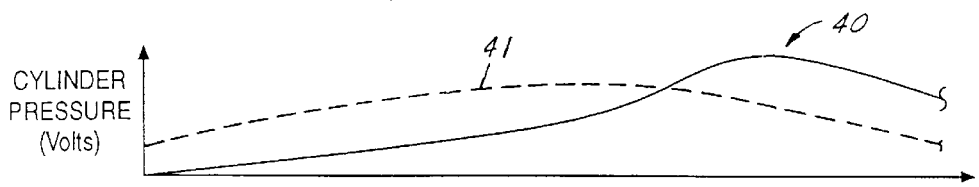
FIG. 2D
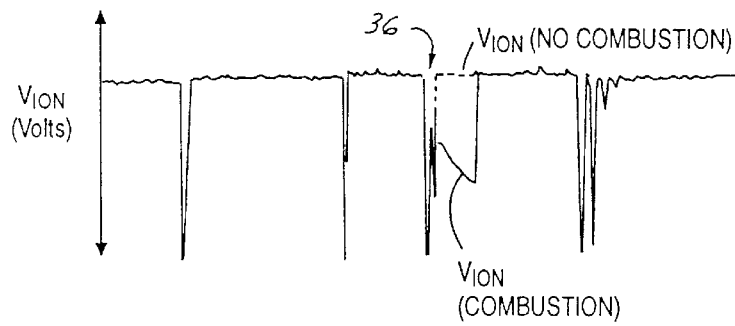
FIG. 2E
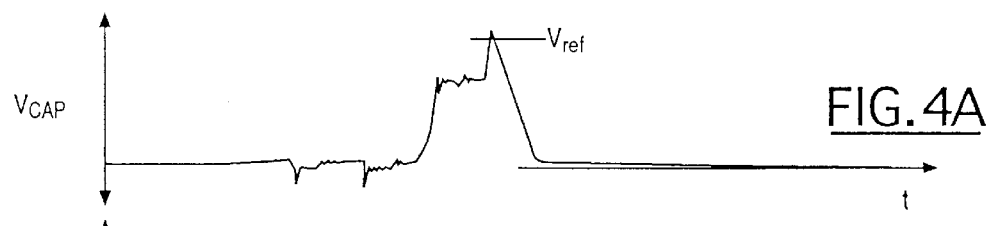
FIG. 4A
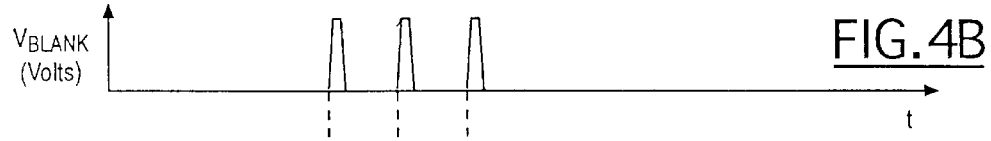
FIG. 4B
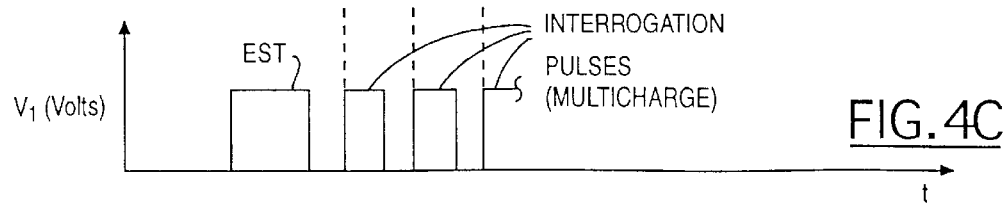
FIG. 4C

MAKE VOLTAGE BIAS ION SENSE MISFIRED DETECTION SYSTEM

TECHNICAL FIELD

The present invention relates generally to a system for detecting a combustion condition in an internal combustion engine, and more particularly, to a system configured to develop a bias voltage for ion current measurement within a combustion chamber of the engine.

BACKGROUND OF THE INVENTION

It is desirable to detect a misfire condition during the operation of an internal combustion engine. One approach taken in the art to detect misfire involves assessing the degree of engine speed (RPM) variation. Although such an approach does not require additional circuit components, it does require relatively extensive software to perform the evaluation, and, further, is incapable of producing accurate and reliable results over the entire engine speed and load range on a higher number of cylinder engines.

Another approach involves the use of a so-called ion sense system. It is known that the combustion of an air/fuel mixture in an engine results in molecules in the cylinder being ionized. It is further known to apply a relatively high voltage across, for example, the electrodes of a spark plug just after the ignition operation to produce a current across the electrodes. Such current is known as an ion current. The ion current that flows is proportional to the number of combustion ions present in the area of, for example, the spark plug gap referred to above, and is consequently indicative of the ionization throughout the entire cylinder as combustion occurs. The level or amount of ion current is indicative of the quality of the combustion event, or whether in fact combustion has occurred at all (e.g., a misfire condition).

Known ion current sensing systems generally include, in addition to an ignition coil, a capacitor or the like configured to store a voltage. The stored voltage is thereafter used as a "bias" voltage which is applied to the spark plug to generate the ion current. These systems therefore require additional circuitry for the storing and biasing operation, which may be undesirable in certain circumstances.

U.S. Pat. No. 5,814,994 to Hohner et al. discloses a system to generate an ion current and purports to provide a control circuit configured to drive an ignition transistor such that a saw-toothed collector current, or alternatively, a triangle-shaped current, results as a primary current. Although the circuitry of such a control circuit is not disclosed in detail, it is believed that such circuitry would be relatively complicated, and further, would require that the ignition transistor dissipate a relatively increased amount of power. These aspects may also be undesirable in certain circumstances.

Moreover, known ion sense systems, while capable of producing results over the entire engine speed and load range, even on a higher number of cylinder engines, generally require a microprocessor or the like, and thus are more expensive.

There is therefore a need to provide an apparatus for detecting a combustion condition, such as a misfire condition, that minimizes or eliminates one or more of the shortcomings as set forth above.

SUMMARY OF THE INVENTION

This invention provides for accurate and reliable detection of a combustion condition, such as a misfire condition, without the need for extra hardware components, and can thus be provided at a lower cost. Moreover, an apparatus in accordance with this invention is full engine speed and load capable, and does not require extensive software overhead as do certain known misfire detection systems.

This invention advantageously makes use of a so-called "make" voltage. Historically, contact breaker points were used in ignition systems to alternatively establish and interrupt the flow of primary current through an ignition coil. Closure of the contact breaker points was known as a "make" condition. Notwithstanding technological advancements which have largely displaced contact breaker points with, for example, solid state devices, the term "make" continues to be used. During charging of the ignition coil, a positive voltage (i.e., a "make" voltage) is generated across the spark plug gap. When the make voltage is generated across the spark gap for the initial coil charging, combustion has not yet occurred and thus little if any ion current will flow. Therefore, in accordance with the present invention, after combustion has occurred, the ignition coil is recharged, preferably for a predetermined time, to reestablish the make voltage across the secondary winding. The make voltage bias causes an ion current to flow wherein a valid indication of combustion (or lack thereof) may be obtained.

An apparatus for detecting a combustion condition in accordance with the present invention therefor includes an ignition coil, a switch, means for closing the switch after an ignition control signal so as to establish a make voltage for biasing a spark plug, and an ion current sensing circuit. During the initial ignition coil charging, a make voltage is established across a secondary winding of the ignition. Charging is interrupted to generate the spark. During the initial spark operation, a spark current flows across the electrodes of the spark plug. Thereafter, an ion sense interval is commenced by activating the switch closing means to thereby begin recharging of the ignition coil. Recharging establishes the make voltage across the secondary winding. During this interval, however, if combustion has occurred, the cylinder will contain ionized molecules, which will also be present in the spark plug gap. The make voltage bias will cause an ion current to flow. During ion current flow, the sensing circuit generates an ion sense signal representative of the ion current.

In one embodiment, the sensing circuit includes a resistor between a low side end of the secondary winding and a ground node. The resistor produces the ion sense signal when the ion current flows therethrough.

In a further embodiment, the switch closing means includes a control circuit configured to generate an interrogation pulse signal in timed relation after the ignition control signal. The interrogation pulse signal is operative to close the switch to begin recharging of the ignition coil. During recharging, the make voltage is established for biasing the spark gap.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

FIGS. 2A–2E are timing diagram views corresponding to the operation of the system shown in FIGS. 1A–1B;

DESCRIPTION OF THE PREFERRED EMBODIMENT

Figure 1A:
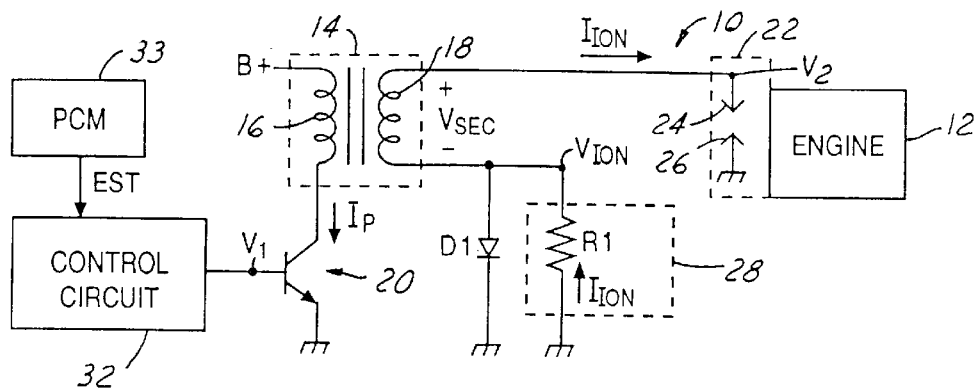
FIG. 1A is a simplified schematic and block diagram view of an apparatus in accordance with the present invention showing a current flow during an ion current sense interval of operation.
Figure 1B:
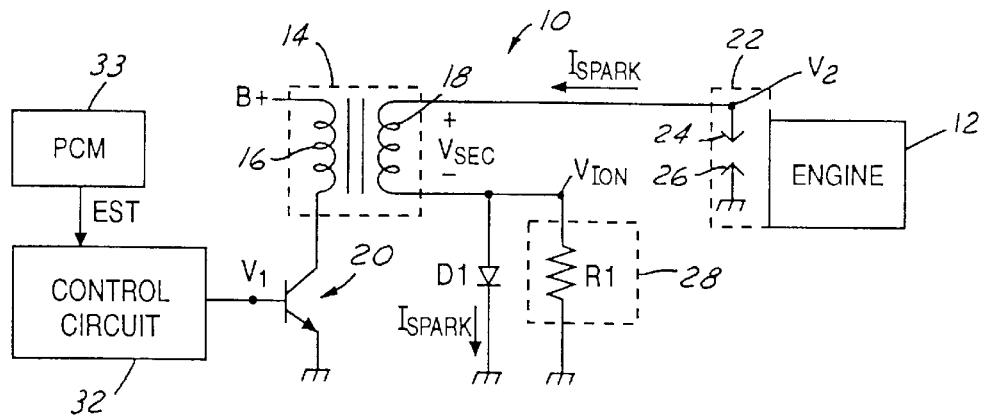
FIG. 1B is a simplified schematic and block diagram view of the apparatus shown in FIG. 1A showing a current flow during a spark generation interval of operation.

Referring now to the drawings wherein like reference numerals are used to identify identical components in the various views, FIGS. 1A–1B illustrate an apparatus 10 for detecting a combustion condition, such as a misfire condition, in an internal combustion engine 12. Apparatus 10 includes an ignition coil 14 comprising primary winding 16 and secondary winding 18, a switch 20, a spark plug 22 comprising first electrode 24 and second electrode 26, and an ion current sensing circuit 28 comprising, in the illustrated embodiment, a sensing element, such as resistor R1. Apparatus 10 further includes a diode D1 and a control circuit 32.

Engine 12 may be of the type having a direct ignition system for initiating combustion. In the illustrated embodiment, one ignition coil is provided per plug 22.

Ignition coil 14 is configured to function as a selectively controllable step-up transformer. One end, such as the high side end, of primary winding 16 is connected to a supply voltage provided by a power supply, such as a vehicle battery (not shown), hereinafter designated "B+" in the drawings. Supply voltage B+ may nominally be approximately 12 volts. A second end of primary winding 16 opposite the high side end is connected to switch 20. A first end of secondary winding 18, namely the high side end, is coupled to spark plug 22. A second end of secondary winding 18 opposite the high side end, namely the low side end, is connected to a ground node through sensing circuit 28. Primary winding 16 and secondary winding 18 are matched in a predetermined manner known in the art.

Switch 20 is provided to selectively connect primary winding 16 to ground, in accordance with a control voltage on node $V_1$ generated by control circuit 32. Such connection, as is known generally in the art, will cause a primary current $I_p$ to flow through primary winding 16. Switch 20 is illustrated in the Figures as a bipolar transistor; however, it should be understood that such illustration is exemplary only and not limiting in nature. Switch 20 may comprise alternative conventional components known to those of ordinary skill in the art.

Coil 14 and switch 20 together define the means for selectively storing energy, preferably in a predetermined amount, and thereafter transferring the stored energy to spark plug 22 in accordance with an ignition control signal EST (whose function will be described in detail hereinafter).

Spark plug 22 is disposed in engine 12 proximate a cylinder thereof, and is configured to produce a spark across a gap defined by spaced electrodes 24, 26. The spark event, as is generally understood by those of ordinary skill in the art, is provided to ignite an air and fuel mixture introduced into the cylinder. During the spark event, a spark current, designated $I_{SPARK}$ in FIG. 1B, flows across plug electrodes 24, 26. In addition, spark plug 22 is configured so that when biased by a make voltage an ion current, designated $I_{ION}$ in FIG. 1A, is carried across electrodes 24, 26. The magnitude of the ion current is indicative of a combustion condition, such as combustion, and/or misfire. In particular, the greater the ion current (i.e., due to more ionized molecules present in the cylinder), the more complete the combustion.

Diode D1 is configured to provide a path for the spark current $I_{SPARK}$. Although shown as being directly connected to a ground node, this is for clarity only; other circuit elements may be introduced without departing from the spirit and scope of the invention.

Circuit 28 is configured to perform multiple functions. In particular, circuit 28 is configured to provide the means for sensing the ion current $I_{ION}$ and to generate in response thereto an ion sense signal. In apparatus 10, circuit 28 generates an ion sense signal in the form of a voltage signal designated $V_{ION}$ through the routing of the ion current through resistor R1. The resistive value of resistor R1 may be selected, based on the characteristics of plug 22, to develop a voltage level within a desired range. FIGS. 1A–1B are simplified views showing R1 connected directly to a ground node for purposes of clarity only. It should be understood that R1 connected directly to a ground node is exemplary only and not limiting in nature. For example, in one embodiment, R1 is connected through intermediate circuitry to a regulated $V_{cc}$ power supply, and thence to ground. Inasmuch as the make voltage bias in accordance with the invention is relatively large with respect to $V_{cc}$, this alternate configuration provides satisfactory performance (i.e., the relatively constant and relatively reduced voltage magnitude of $V_{cc}$ does not impair accurate ion current sensing). Other configurations are possible, which are within the spirit and scope of the present invention. It should be further understood that the ion sense signal may be a current signal proportional to the ion current, and therefore representative of such ion current in a predetermined manner (e.g., through use of a current mirror circuit).

Control circuit 32 is configured generally to control the opening and closure of switch 20 by controlling, for example, a voltage level at node $V_1$ in a manner generally understood by those of ordinary skill in the art of ignition control. In the illustrated embodiment shown in FIGS. 1A–1B, control circuit 32 is configured to control the state of conduction of switch 20 in accordance with the state of an input signal thereto, namely an ignition control signal EST (electronic spark timing). The ignition control signal EST may be generated by, for example, a powertrain control module (PCM) 33 in accordance with known ignition control strategies. Control circuit 32 is further configured to generate an interrogation pulse signal on node $V_1$ in timed relation after the ignition control signal EST in order to close switch 20 to establish a make voltage across secondary winding 18 for biasing the plug gap. Control circuit 32 thus defines the means for closing switch 20 after the ignition control signal EST.

Control circuit 32 may comprise conventional components. The art is replete with various approaches for implementing a control circuit for driving switch 20 in response to the ignition control signal EST. Implementing a control circuit for generating the interrogation signal as described in detail herein requires no more than routine application of the practices known to those of ordinary skill in the art.

Referring now to FIGS. 2A–2E, and with continued reference to FIGS. 1A–1B, the operation of an embodiment according to the present invention will now be set forth. PCM 33, in accordance with a predetermined operating strategy, based on a plurality of engine operating parameter inputs, determines when to assert the ignition control signal EST. The asserted ignition control signal EST is the command to commence charging of ignition coil 14 for a spark event. Control circuit 32, in response thereto, adjusts the control voltage on node $V_1$, which causes switch 20 to conduct, wherein a primary current $I_p$ flows through primary winding 16. The assertion of the ignition control signal EST is shown in FIG. 2A. During the charging of ignition coil 14, a positive make voltage, designated $V_{MAKE}$ is generated across the spark gap. The make voltage $V_{MAKE}$ during initial charging is shown in FIG. 2C. Inasmuch as this is the initial charging of ignition coil 14 in preparation of a spark event, combustion has not yet occurred. Accordingly, notwithstanding the make voltage bias across spark plug electrodes 24, 26, no appreciable ion current flows. This is shown in FIG. 2E.

Ignition control signal EST is applied, in the illustrated embodiment, as a positive going pulse having a duration corresponding to a desired primary ignition coil charge time. As described above, charging commences at the time of receipt by control circuit 32 of a rising (positive going) edge of the EST signal. Upon receipt of a falling (negative going) edge of the ignition control signal EST, control circuit 32 causes switch 20 to open, thereby causing an interruption in the primary current $I_p$. It is well understood by those of ordinary skill in the art of ignition control that such interruption results in a relatively high voltage being immediately established across secondary winding 18, due to the collapsing magnetic fields associated with the interruption of the primary current. The secondary voltage will continue to rise until reaching a break down voltage across electrodes 24, 26 of spark plug 22, indicated at reference numeral 34 in FIG. 2C. Current will thereafter discharge across the gap, as is generally understood in the art. During the spark event, a relatively large negative (relative to ground) voltage is established at the spark plug at node $V_2$. The spark current $I_{SPARK}$, as shown in FIG. 1B, flows from ground, across spark plug electrodes 24, 26, through secondary winding 18, and thereafter through forward-biased diode D1.

A predetermined time after the ignition control signal EST is discontinued by, for example, PCM 33, control circuit 32 generates or otherwise asserts an interrogation pulse signal. The interrogation pulse signal is the command to cause switch 20 to reconnect primary winding 16 to ground, ostensibly to recharge ignition coil 14 by causing the primary current $I_p$ to flow through primary winding 16. During recharge, the make voltage $V_{MAKE}$ is established across secondary winding 18. The time interval between the end of the EST pulse, and generation of the interrogation pulse, may be selected in accordance with known characteristics of the combustion process of engine 12, as well as various operating parameters associated with engine 12, as known in the art. Moreover, the interrogation pulse signal is generated before a respective ignition control signal EST associated with a next cylinder combustion event of engine 12 is generated. The latest time the interrogation pulse signal may be generated may be a limit defined by a predetermined number of degrees after top dead center of the cylinder in which combustion is being assessed. It should be appreciated that the interrogation pulse may be initiated or commanded by other control units and provided to control circuit 32, such that circuit 32 responds by driving switch 20 to closure in response thereto.

As shown in FIG. 2C, for the duration of the interrogation pulse signal, a make voltage $V_{MAKE}$ is impressed across secondary winding 18, which, in the configuration shown in FIG. 1A, biases spark plug 22 with a relatively positive voltage at node $V_2$. If combustion has occurred, the make voltage will cause an ion current $I_{ION}$ to flow. Such flow will occur through resistor R1, inasmuch as diode D1 is back-biased. The configuration illustrated in FIG. 1A will result in a negative voltage being developed at the low side end of secondary winding 18. This negative voltage defines an ion sense signal, designated $V_{ION}$. The magnitude of the ion current, and thus the corresponding voltage $V_{ION}$, is dependent upon the concentration of ions, which in turn corresponds to the quality of combustion.

As shown in FIG. 2E, after switching noise 36 is suppressed in accordance with a blanking pulse 38 (to be described in further detail hereinafter), a relatively large negative ion sense signal $V_{ION}$ is generated which indicates combustion. As shown in FIG. 2D, combustion is confirmed by the amplitude and timing of a cylinder pressure signal 40.

In contrast, where no combustion occurs, the ion sense signal $V_{ION}$ remains relatively flat, as indicated in dashed-line format in FIG. 2E. No combustion is confirmed by the amplitude and timing of a cylinder pressure signal 41 as shown in dashed-line format in FIG. 2D.

It should therefore be appreciated that an apparatus in accordance with the present invention requires no extra hardware or circuit components to develop the bias required to cause the ion current $I_{ION}$ to flow. In addition, the "raw" signal $V_{ION}$ requires only relatively simple processing to be in a condition suitable for use in an engine control or diagnostic system.

Figures 3A, 3B:
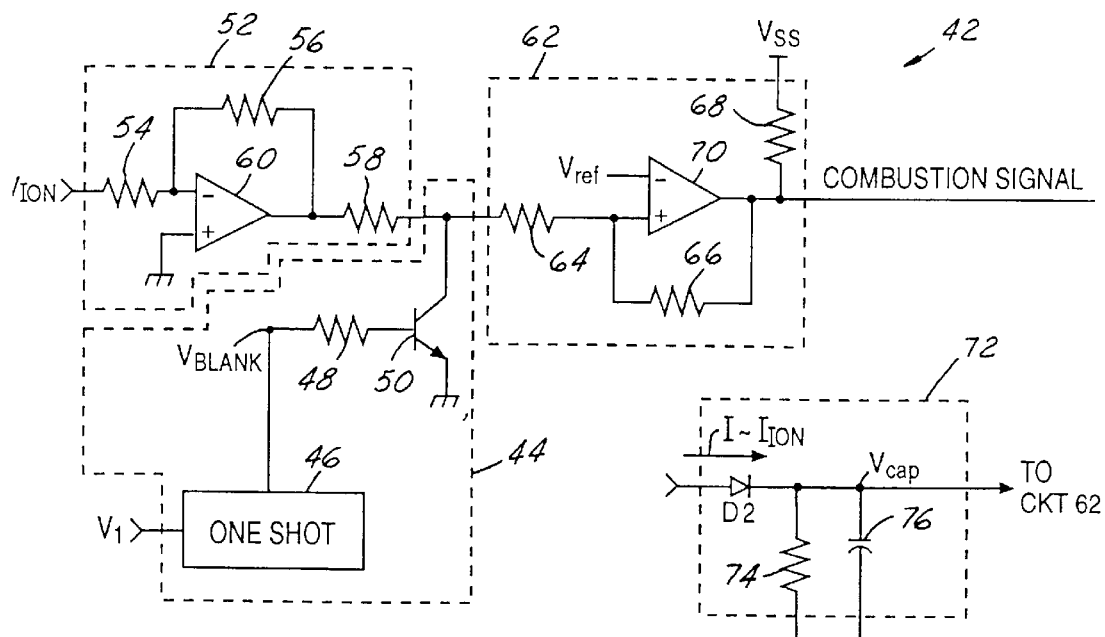
FIG. 3A is a simplified schematic and block diagram view of a first embodiment of a processing circuit for use in connection with the apparatus illustrated in FIGS. 1A–1B.
FIG. 3B is a simplified schematic diagram view of an integrator circuit embodiment for use in connection with the processing circuit of FIG. 3A; and, FIGS. 4A–4C are timing diagram views corresponding to the operation of the invention.

Referring now to FIG. 3A, an exemplary signal processing circuit 42 is illustrated. Circuit 42 includes a switching noise suppression circuit 44 comprising timing logic, preferably a one shot 46, a resistor 48, and a transistor 50, an inverter circuit 52 comprising resistors 54, 56, and 58, and an op amp 60, and a comparator circuit 62 comprising resistors 64, 66, and 68, and a comparator 70. Circuit 52 inverts the raw ion signal $V_{ION}$. The switching noise 36 (best shown in FIG. 2E) is filtered (i.e., clamped) by transistor 50, which is controlled by one shot 46 triggered by the interrogation pulse signal. The pulse provided by one shot 46 defines a blanking pulse 38, which is best shown in FIG. 2B occurring in timed relation to the interrogation pulse. The inverted and filtered ion voltage signal is then compared to a predetermined reference voltage, designated $V_{REF}$ in FIG. 3A. When comparator 70 generates a digital output pulse, such pulse is indicative of combustion. When component 70 fails to generate a pulse, the lack of a pulse means a misfire has occurred.

FIG. 3B shows a modification of the processing circuit shown in FIG. 3A. An integrator circuit 72 includes a diode D2, a resistor 74 and a capacitor 76. Resistor 74 may be a relatively high valued component (e.g., 1M ohm), or may be omitted entirely. A charging current I proportional to the generated ion current $I_{ION}$ is received through diode 72 and charges capacitor 76. The diode D2 prevents charge from leaking off of capacitor 76. Capacitor 76 operates to integrate the ion sense signal $V_{ION}$, which accumulates on capacitor 76 as $V_{CAP}$. This "integrated" signal may thereafter be compared to a reference voltage $V_{REF}$ in a manner described above.

FIGS. 4A–4B show exemplary timing diagrams for the operation of the inventive make voltage bias apparatus 10 in a so-called repetitive spark or multicharge system, known generally to those of ordinary skill in the art. FIG. 4C shows the initial ignition control signal EST followed by a plurality of interrogation pulses operative to recharge ignition coil 14. The corresponding blanking pulses 38 are shown in FIG. 4B. FIG. 4A shows the $V_{CAP}$ signal as it accumulates to reach a reference voltage $V_{REF}$ predetermined to indicate a desired level of combustion. Failure to reach this level within the operating envelope defined for the repetitive spark control scheme indicates a misfire condition.

A system in accordance with the present invention provides accurate and reliable detection of a combustion condition, such as a misfire condition, without the need for extensive additional components required by conventional systems for biasing of the spark plug for ion current measurement. An apparatus according to this invention, moreover, is full engine speed and load capable.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

What is claimed is:

1. An apparatus for detecting a combustion condition in an internal combustion engine, comprising:

an ignition coil having a primary winding and a secondary winding, said primary winding including a first end coupled to a power supply;

a switch connected to a second end of said primary winding opposite said first end and configured to selectively cause a primary current to flow through said primary winding in response to an ignition control signal;

means for closing said switch after said ignition control signal so as to establish a make voltage for biasing a spark plug connected to said secondary winding;

a sensing circuit coupled to said secondary winding configured to generate an ion sense signal representative of an ion current produced in response to said make voltage bias.

2. The apparatus of claim 1 wherein said switch closing means includes a control circuit configured to generate an interrogation signal in timed relation after said ignition control signal, said switch being responsive to said interrogation signal to establish said make voltage.

3. The apparatus of claim 1 wherein said sensing circuit comprises a resistor.

4. The apparatus of claim 1 wherein said switch closing means includes means for closing said switch a predetermined time after termination of said ignition control signal.

5. The apparatus of claim 1 further comprising a processing circuit responsive to said ion sense signal configured to generate a combustion signal comprising a first state corresponding to a misfire condition and a second state corresponding to said combustion condition.

6. The apparatus of claim 5 wherein said processing circuit includes:

a noise suppression circuit having a blanking circuit; and, a comparator circuit for generating said combustion signal.

7. The apparatus of claim 6 wherein said processing circuit further includes an integrator circuit intermediate said noise suppression circuit and said comparator circuit configured to integrate said ion sense signal.

8. The apparatus of claim 1 further comprising a processing circuit responsive to said ion sense signal configured to generate a combustion signal indicative of a degree of combustion.

9. An apparatus for detecting a combustion condition in an internal combustion engine, comprising:

means for selectively storing a predetermined amount of energy and transferring said stored energy to a spark plug disposed proximate a cylinder of the engine in response to an ignition control signal, said energy being configured to produce a spark suitable for initiating combustion;

means for generating an interrogation signal after termination of said ignition control signal, said storing and transferring means being operative to establish a make voltage in response to said interrogation signal for biasing said spark plug to produce an ion current indicative of the combustion condition; and, means for sensing said ion current and generating an ion sense signal in response thereto.

10. The apparatus of claim 9 wherein said storing and transferring means includes an ignition coil, and a switch responsive to said ignition control signal for causing a primary current to flow through a primary winding of said coil.

11. The apparatus of claim 10 wherein said interrogation signal generating means includes a control circuit configured to generate said interrogation signal in timed relation after said ignition control signal, said interrogation signal being operative to close said switch so as to establish said make voltage.

12. The apparatus of claim 11 wherein said interrogation signal occurs before a respective ignition control signal associated with a next cylinder of said engine to undergo combustion is generated.

13. In an ignition system for an internal combustion engine including an ignition coil having a secondary winding configured to be connected to a spark plug disposed proximate a cylinder of the engine, a method of detecting a combustion condition comprising the steps of:

(A) generating a primary current in a primary winding of the coil wherein a make voltage is impressed across the secondary winding;

(B) interrupting the primary current to thereby generate a secondary current in the secondary winding configured to cause the spark plug to produce a spark;

(C) after said interrupting step, biasing the spark plug using the make voltage; and, (D) sensing an ion current indicative of the combustion condition and generating an ion sense signal in response thereto.

14. The method of claim 13 wherein step (A) includes the substep of:

coupling the prima winding between a power supply and a ground node by closing a switch disposed intermediate the primary winding and the ground node.

15. The method of claim 14 wherein step (C) includes the substep of:

coupling the primary winding between the power supply and the ground node by closing the switch to thereby establish the make voltage for biasing the spark plug.

16. The method of claim 13 wherein step (D) comprises the substeps of:

providing a resistive element; and, passing the ion current through the resistive element.

17. The method of claim 13 further comprising the step of:

determining when the ion sense signal exceeds a predetermined threshold level and generating a combustion signal in response thereto indicative of an occurrence of a desired level of combustion.

18. The method of claim 13 further comprising the step of:

determining when the ion sense signal is less than a predetermined threshold level and generating a misfire signal in response thereto indicative of an occurrence of a misfire event.

* * * * *